US006602577B1

(12) United States Patent
Ostendorf et al.

(10) Patent No.: US 6,602,577 B1
(45) Date of Patent: Aug. 5, 2003

(54) EMBOSSED CELLULOSIC FIBROUS STRUCTURE

(75) Inventors: Ward William Ostendorf, West Chester, OH (US); Lisa Craft Blanton, Lebanon, OH (US); Gregory William Duritsch, West Harrison, IN (US); Kevin Mitchell Wiwi, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 09/677,654

(22) Filed: Oct. 3, 2000

(51) Int. Cl.[7] ............................ B32B 3/00; D21H 11/00

(52) U.S. Cl. ....................... 428/156; 428/154; 428/166; 428/172; 162/111

(58) Field of Search ................................ 428/154, 153, 428/156, 166, 172, 212; 162/109, 111

(56) References Cited

U.S. PATENT DOCUMENTS

| | | | | |
|---|---|---|---|---|
| 3,323,963 | A | 6/1967 | Palmer et al. | 162/362 |
| 3,414,459 | A | 12/1968 | Wells | 161/131 |
| 3,547,723 | A | 12/1970 | Gresham | 156/209 |
| 3,556,907 | A | 1/1971 | Nystrand | 156/470 |
| 3,708,366 | A | 1/1973 | Donnelly | 156/209 |
| 3,708,383 | A | 1/1973 | Thomas et al. | 161/57 |
| 3,738,905 | A | 6/1973 | Thomas | 161/127 |
| 3,867,225 | A | 2/1975 | Nystrand | 156/209 |
| 3,867,872 | A | 2/1975 | Nystrand | |
| 3,868,205 | A | 2/1975 | Thomas | 425/363 |
| 3,940,529 | A | 2/1976 | Hepford et al. | 428/178 |
| 3,961,119 | A | 6/1976 | Thomas | 428/178 |
| 3,994,771 | A | 11/1976 | Morgan, Jr. et al. | 162/113 |
| 4,181,068 | A | 1/1980 | Pollock | |
| 4,189,344 | A | 2/1980 | Busker | |
| 4,191,609 | A | 3/1980 | Trokhan | 162/113 |
| 4,225,382 | A | 9/1980 | Kearney et al. | 162/111 |
| 4,236,963 | A | 12/1980 | Busker | |
| D258,154 | S | 2/1981 | Elchook, Jr. et al. | |
| D260,193 | S | 8/1981 | Elchook, Jr. et al. | |
| 4,300,981 | A | 11/1981 | Carstens | 162/109 |
| 4,307,141 | A | 12/1981 | Walbrun | |
| 4,320,162 | A | 3/1982 | Schulz | 428/154 |
| 4,325,768 | A | 4/1982 | Schulz | 156/206 |
| D264,512 | S | 5/1982 | Rogers | |
| 4,339,088 | A | 7/1982 | Niedermeyer | |
| D267,361 | S | 12/1982 | Schulz | |
| 4,483,728 | A | 11/1984 | Bauernfeind | 156/209 |
| 4,514,345 | A | 4/1985 | Johnson et al. | 264/22 |
| 4,528,239 | A | 7/1985 | Trokhan | 428/247 |
| 4,529,480 | A | 7/1985 | Trokhan | 162/109 |
| 4,543,142 | A | 9/1985 | Kuepper et al. | 156/209 |
| 4,637,859 | A | 1/1987 | Trokhan | 162/109 |

(List continued on next page.)

FOREIGN PATENT DOCUMENTS

| | | | |
|---|---|---|---|
| EP | 0 755 212 B1 | 1/1997 | |
| EP | 0980751 A1 | 2/2000 | |
| JP | 07268800 | 10/1995 | |
| WO | WO 96/00812 | 1/1996 | D21F/11/00 |
| WO | WO 96/18771 A1 | 6/1996 | |
| WO | WO 00/73053 A1 | 12/2000 | |

OTHER PUBLICATIONS

US 5,972,466, 10/1999, Trokhan (withdrawn)
U.S. patent application Ser. No. 09/334,150, Kelly, filed Jun. 16, 1999.

*Primary Examiner*—Donald J. Loney
(74) *Attorney, Agent, or Firm*—Julia A. Glazer; Stephen T. Murphy; David M. Weirich

(57) ABSTRACT

An embossed multiple ply paper product which displays aesthetically pleasing decorative attributes. The embossed multiple ply paper product also exhibits the functional characteristics of softness, absorbency, and drape. The decorative attributes comprise embossed patterns of indicia displaying a high quality cloth-like appearance for a softer, more quilted look.

16 Claims, 4 Drawing Sheets

U.S. PATENT DOCUMENTS

| | | | | |
|---|---|---|---|---|
| 4,659,608 | A | 4/1987 | Schulz | 428/171 |
| 4,759,967 | A | 7/1988 | Bauernfeind | 428/154 |
| 4,761,322 | A | 8/1988 | Raley | |
| D298,702 | S | 11/1988 | Drew | |
| 4,803,032 | A | 2/1989 | Schulz | 264/284 |
| 4,921,034 | A | 5/1990 | Burgess et al. | 162/109 |
| D319,349 | S | 8/1991 | Schultz et al. | |
| 5,093,068 | A | 3/1992 | Schulz | 264/284 |
| 5,158,523 | A | 10/1992 | Houk et al. | 493/396 |
| 5,173,351 | A | 12/1992 | Ruppel et al. | |
| 5,215,617 | A | 6/1993 | Grupe | |
| 5,215,626 | A | 6/1993 | Ampulski et al. | 162/112 |
| 5,217,576 | A | 6/1993 | Van Phan | 162/158 |
| 5,245,025 | A | 9/1993 | Trokhan et al. | 536/56 |
| 5,262,007 | A | 11/1993 | Phan et al. | 162/158 |
| 5,269,983 | A | 12/1993 | Schulz | |
| 5,275,700 | A | 1/1994 | Trokhan | 162/358.1 |
| 5,294,475 | A | 3/1994 | McNeil | 428/154 |
| 5,300,347 | A | 4/1994 | Underhill et al. | |
| 5,328,565 | A | 7/1994 | Rasch et al. | 162/113 |
| 5,332,118 | A | 7/1994 | Muckenfuhs | 221/48 |
| D350,197 | S | 8/1994 | Huffman | D24/124 |
| 5,334,289 | A | 8/1994 | Trokhan et al. | 162/358.2 |
| 5,356,364 | A | 10/1994 | Veith et al. | 493/395 |
| D352,833 | S | 11/1994 | Schulz | |
| 5,364,504 | A | 11/1994 | Smurkoski et al. | 162/116 |
| 5,382,464 | A | 1/1995 | Ruppel et al. | 428/172 |
| 5,383,778 | A | 1/1995 | Schulz | |
| 5,389,204 | A | 2/1995 | Ampulski | 162/135 |
| D358,035 | S | 5/1995 | Zander et al. | |
| 5,415,918 | A | 5/1995 | Lang et al. | |
| 5,436,057 | A | 7/1995 | Schulz | |
| 5,443,889 | A | 8/1995 | Ruppel et al. | 428/172 |
| D362,967 | S | 10/1995 | Rothwell et al. | |
| 5,468,323 | A | 11/1995 | McNeil | 156/209 |
| 5,490,902 | A | 2/1996 | Schulz | |
| 5,503,896 | A | 4/1996 | Veith et al. | 428/141 |
| 5,527,428 | A | 6/1996 | Trokhan et al. | 162/116 |
| 5,529,563 | A | 6/1996 | Veith et al. | 493/395 |
| 5,529,665 | A | 6/1996 | Kaun | |
| D371,910 | S | 7/1996 | Schulz | |
| D372,589 | S | 8/1996 | Burgess et al. | |
| 5,555,801 | A | 9/1996 | Kroyer | |
| 5,556,509 | A | 9/1996 | Trokhan et al. | 162/111 |
| 5,562,776 | A | 10/1996 | Sapru et al. | 118/723 |
| 5,597,639 | A | 1/1997 | Schulz | |
| 5,609,725 | A | 3/1997 | Van Phan | 162/117 |
| 5,620,776 | A | 4/1997 | Schulz | 428/156 |
| D382,118 | S | 8/1997 | Ferrero | |
| D382,119 | S | 8/1997 | Ferrero | |
| D382,713 | S | 8/1997 | Giesler, Sr. | |
| 5,679,222 | A | 10/1997 | Rasch et al. | 162/358.1 |
| D386,620 | S | 11/1997 | Giesler | |
| 5,686,168 | A | 11/1997 | Laurent et al. | |
| 5,693,403 | A | 12/1997 | Brown et al. | |
| 5,693,406 | A | 12/1997 | Wegele et al. | 429/179 |
| 5,709,775 | A | 1/1998 | Trokhan et al. | 162/117 |
| 5,727,458 | A | 3/1998 | Schulz | |
| 5,736,224 | A | 4/1998 | Dodge | |
| 5,776,312 | A | 7/1998 | Trokhan et al. | 162/358.2 |
| 5,779,965 | A | 7/1998 | Beuther et al. | |
| 5,792,545 | A | 8/1998 | Kawai et al. | |
| 5,795,440 | A | 8/1998 | Ampulski et al. | 162/117 |
| 5,817,213 | A | 10/1998 | Ostermayer et al. | |
| D401,421 | S | 11/1998 | Schulz | |
| 5,840,404 | A | 11/1998 | Graff | 428/154 |
| 5,846,636 | A | 12/1998 | Ruppel et al. | 428/154 |
| 5,858,554 | A | 1/1999 | Neal et al. | 428/537.5 |
| 5,861,081 | A | 1/1999 | Bredendick et al. | |
| D405,270 | S | 2/1999 | Horner-Long et al. | |
| D405,271 | S | 2/1999 | Unwin et al. | |
| 5,874,156 | A | 2/1999 | Schulz | 428/156 |
| D407,225 | S | 3/1999 | Dwiggins et al. | |
| D407,902 | S | 4/1999 | Schulz et al. | |
| D408,152 | S | 4/1999 | Wilhelm et al. | |
| 5,897,930 | A | 4/1999 | Calhoun et al. | 428/41.8 |
| 5,900,114 | A | 5/1999 | Brown et al. | 162/117 |
| 5,900,122 | A | 5/1999 | Huston | 162/348 |
| 5,904,812 | A | 5/1999 | Salman et al. | 162/117 |
| 5,906,710 | A | 5/1999 | Trokhan | 162/109 |
| D410,337 | S | 6/1999 | Dwiggins et al. | |
| 5,908,707 | A | 6/1999 | Cabell et al. | 428/537.5 |
| 5,913,765 | A | 6/1999 | Burgess et al. | |
| 5,922,439 | A | 7/1999 | Bredenick et al. | |
| 5,935,381 | A | 8/1999 | Trokhan et al. | 162/109 |
| 5,935,893 | A | 8/1999 | Lawson et al. | 502/157 |
| D414,612 | S | 10/1999 | Haubert | |
| D416,393 | S | 11/1999 | Enderby et al. | |
| D419,307 | S | 1/2000 | Boyce | |
| D419,780 | S | 2/2000 | Funk et al. | D5/53 |
| D419,781 | S | 2/2000 | Pratt et al. | |
| D420,517 | S | 2/2000 | Guillot et al. | |
| 6,030,690 | A | 2/2000 | McNeil et al. | 428/156 |
| 6,032,712 | A | 3/2000 | Biagiotti | |
| 6,033,523 | A | 3/2000 | Dwiggins et al. | |
| 6,036,909 | A | 3/2000 | Baum | |
| D422,150 | S | 4/2000 | Enderby | D5/58 |
| D422,416 | S | 4/2000 | Schulz et al. | |
| 6,053,232 | A | 4/2000 | Biagiotti | |
| D424,811 | S | 5/2000 | Pratt et al. | |
| D426,709 | S | 6/2000 | Latchoo et al. | D5/25 |
| 6,077,390 | A | 6/2000 | Salman et al. | 162/117 |
| 6,080,276 | A | 6/2000 | Burgess | |
| D428,264 | S | 7/2000 | Boyce | |
| 6,086,715 | A | 7/2000 | McNeil | 162/132 |
| 6,106,928 | A | 8/2000 | Laurent et al. | 428/152 |
| 6,106,929 | A | 8/2000 | Bredenick et al. | 428/154 |
| D430,406 | S | 9/2000 | Ingalls | |
| D430,407 | S | 9/2000 | Ingalls | |
| D430,734 | S | 9/2000 | Bredendick et al. | |
| 6,113,723 | A | 9/2000 | McNeil et al. | 156/209 |
| 6,136,413 | A | 10/2000 | Le Port et al. | |
| 6,153,053 | A | 11/2000 | Harper et al. | |
| 6,165,319 | A | 12/2000 | Heath et al. | |
| D436,738 | S | 1/2001 | Bredendick et al. | |
| D441,167 | S | 4/2001 | Graff et al. | |

EMBOSSED CELLULOSIC FIBROUS STRUCTURE

FIELD OF THE INVENTION

The present invention relates to embossed cellulosic fibrous structures.

BACKGROUND OF THE INVENTION

Cellulosic fibrous structures are a staple of everyday life. Cellulosic fibrous structures are used as consumer products for paper towels, toilet tissue, facial tissue, napkins and the like. The large demand for such paper products has created a demand for improved versions of the products and the methods of their manufacture.

Multiple ply cellulosic fibrous structures are very well known in the art of consumer products. Such products are cellulosic fibrous structures having more than one, typically two, plies superimposed in face-to-face relationship to form a laminate. It is known in the art to emboss sheets comprising multiple plies of tissue for aesthetic purposes and to maintain the plies in face-to-face relation during use. In addition, embossing can increase the surface area of the plies thereby enhancing their bulk and water holding capacity.

During the embossing process, the plies are fed through a nip formed between juxtaposed axially parallel rolls. Embossment knobs on these rolls compress like regions of each ply into engagement and contacting relationship with the opposing ply. The compressed regions of the plies produce an aesthetic pattern and provide a means for joining and maintaining the plies in face-to-face contacting relationship.

Embossing is typically performed by one of two processes, knob-to-knob embossing or nested embossing. Knob-to-knob embossing consists of axially parallel rolls juxtaposed to form a nip between the knobs on opposing rolls. Nested embossing consists of embossment knobs of one roll meshed between the embossment knobs of the other roll. Examples of knob-to-knob embossing and nested embossing are illustrated in the prior art by U.S. Pat. No. 3,414,459 issued Dec. 3, 1968 to Wells and commonly assigned; U.S. Pat. No. 3,547,723 issued Dec. 15, 1970 to Gresham; U.S. Pat. No. 3,556,907 issued Jan. 19, 1971 to Nystrand; U.S. Pat. No. 3,708,366 issued Jan. 2, 1973 to Donnelly; U.S. Pat. No. 3,738,905 issued Jun. 12, 1973 to Thomas; U.S. Pat. No. 3,867,225 issued Feb. 18, 1975 to Nystrand and U.S. Pat. No. 4,483,728 issued Nov. 20, 1984 to Bauernfeind.

Knob to knob embossing produces a cellulosic fibrous structure composed of pillowed regions which enhance the thickness of the product. However, the pillows have a tendency to collapse under pressure due to lack of support. Consequently, the thickness benefit is typically lost during the balance of the converting operation and subsequent packaging, diminishing the quilted appearance sought by embossing.

Nested embossing has proven to be the preferred process for producing products exhibiting a softer more quilted appearance that is maintained throughout the balance of the converting process including packaging. With nested embossing, one ply has a male pattern, while the other ply has a female pattern. As the two plies travel through the nip of the embossment rolls, the patterns are meshed together. Nested embossing aligns the knob crests on the male embossment roll with the low areas on the female embossment roll. As a result, the embossed sites produced on one ply provide support for the embossed sites on the other ply.

The lamination point at the nip between nested embossment rolls is typically eliminated, since the knobs on the nested embossment rolls do not touch. This necessitates the addition of a marrying roll to apply pressure for lamination. Typical marrying rolls are solid resulting in the lamination of every potential laminating point as shown in U.S. Pat. No. 3,867,225 issued Feb. 18, 1975 to Nystrand.

The nested embossment rolls may be designed such that the knobs on one roll contact the periphery of the other embossing roll providing a lamination point, thereby eliminating the need for a marrying roll. Such nested embossing arrangement is shown in U.S. Pat. No. 5,468,323 issued Nov. 21, 1995 to McNeil the disclosure of which is incorporated herein by reference. This arrangement also provides a means for improving the bond strength between the plies by enabling a glue applicator roll to be used in conjunction with each of the embossment rolls providing an adhesive joint at each of the embossed sites. Other ways of improving the bond strength between the plies are illustrated in commonly assigned U.S. Pat. No. : 5,858,554 issued to Neal et al. on Jan. 12, 1999 and U.S. Pat. No. 5,693,406 issued to Wegele et al. on Dec. 2, 1997, the disclosures of which are incorporated herein by reference.

Consumer testing of products having embossed cellulosic fibrous structures have determined that a softer, more quilted appearance is desired. Consumers desire products having relatively high caliper with aesthetically pleasing decorative patterns exhibiting a high quality cloth-like appearance. Such attributes must be provided without sacrificing the products' other desired functional qualities of softness, absorbency, drape (flexibility/limpness) and bond strength between the plies.

The prior art teaches that embossing improves appearance and generally improves (i.e.; increases) the functional attributes of absorbency, compressibility, and bulk of the paper product while negatively impacting the drape (i.e.; increasing the bending stiffness) of the paper. The prior art also teaches that lamination improves appearance and generally improves bulk while negatively impacting drape (i.e.; increasing the bending stiffness of the paper).

This is illustrated in commonly assigned U.S. Pat. No. 5,693,406 issued to Wegele et al. on Dec. 2, 1997; U.S. Pat. No. 5,972,466 issued to Trokhan on Oct. 26, 1999; U.S. Pat. No. 6,030,690 issued to McNeil et al. on Feb. 29, 2000; and U.S. Pat. No. 6,086,715 issued to McNeil on Jul. 11, 2000, the disclosures of which are incorporated herein by reference.

Striking a balance between embossing/laminating used to create an aesthetically pleasing product and the functional attributes has always been difficult. The present invention provides a model known as the E factor for optimizing this relationship.

The present invention also yields unexpected results. Based on the prior art, one would expect the aesthetic appearance of the paper to improve as a function of embossing and laminating (i.e.; as embossing and/or laminating is increased the aesthetic appearance improves). Conversely, one would expect as less area of the paper is embossed and/or laminated, one would expect the aesthetic appearance of the paper to decrease.

Hence, it is very surprising to find that the present invention unexpectedly provides an aesthetically pleasing tissue and improvements in absorbency while utilizing less total embossed and laminated area, and while concurrently providing improvements in softness when compared to the prior art.

Softness is the pleasing tactile sensation customers perceive when they crumple the paper in their hands and while using the paper for its intended purposes. Softness is a function of the compressibility of the paper, the flexibility of the paper and the surface texture.

Absorbency is the characteristic of the paper which allows it to take up and retain fluids, particularly—water and aqueous solutions and suspensions. In evaluating the absorbency of paper, not only is the absolute quantity of fluid a given amount of paper will hold significant, but the rate at which the paper will absorb the fluid is also important. In addition, when the paper is formed into a product such as a towel or wipe, the ability of the paper to cause a fluid to be taken up into the paper and thereby leave a dry wiped surface is also important.

SUMMARY OF THE INVENTION

The present invention relates to a model for describing an aesthetically pleasing tissue paper which also exhibits improved absorbency and softness utilizing less total embossed area as compared to the prior art. The embossed tissue paper of the invention may be comprised of one or more plies of tissue paper. The tissue paper includes a plurality of embossments. The paper has a total embossed area of about 15% or less and an E factor of between about 0.0100 to 3 inches$^4$ per number of embossments (i.e.; about 0.416 to 125 cm$^4$ per number of embossments). Each embossment is made on a roll having knobs which protude from about 0.05 inches to 0.1 inches from the plane of the roll (i.e.; about 0.127 cm to 0.254 cm).

The embossed tissue paper may also be further comprised of a plurality of domes. The domes are formed during the papermaking process. There are approximately from about 10 to 1000 domes per square inch of the tissue paper (i.e.; about 1.55 to 155 domes per square centimeter of tissue paper). The embossed tissue paper of the present invention will have a ratio of the number of embossments per unit area to the number of domes per unit area of about 0.025 to 0.25 and preferably about 0.05 to 0.15.

The embossed tissue paper may be comprised of one or more plies. At least one of the plies is embossed. The ply may be embossed on one or both sides of the tissue paper.

DETAILED DESCRIPTION OF THE INVENTION

Definitions

As used herein the following terms have the following meanings:

"Embossing" refers to a type of paper finish obtained by mechanically impressing a design on the finished paper with engraved metallic rolls or plates.

"Laminating" refers to the process of firmly uniting superposed layers of paper with or without adhesive, to form a multi-ply sheet.

"Machine Direction" refers to the direction parallel to the flow of paper through the papermaking equipment.

"Cross Machine Direction" refers to the direction perpendicular to the flow paper through the papermaking equipment.

Figure 2:
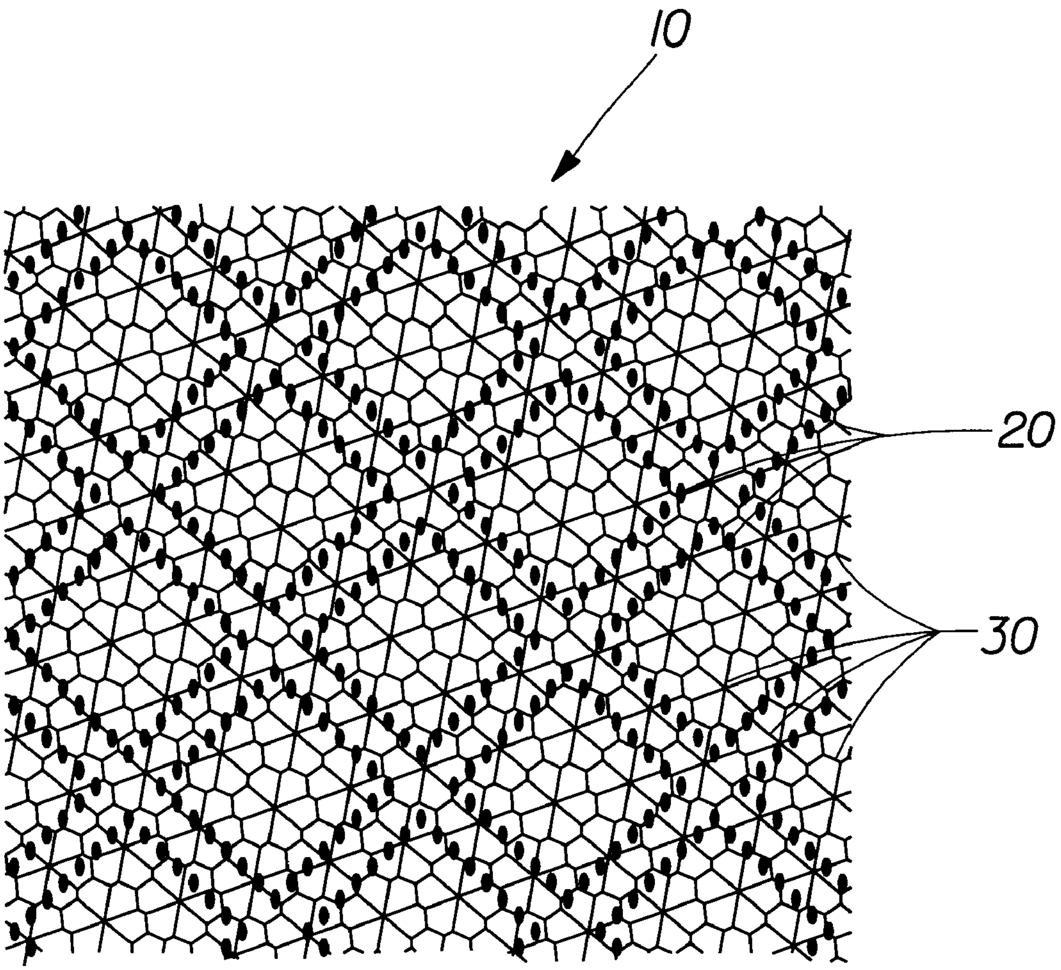
FIG. 2 is a fragmentary plan view of a multiple ply paper product displaying an embodiment of the present invention.

The paper of the present invention is equally applicable to all types of consumer paper products such as paper towels, toilet tissue, facial tissue, napkins, and the like. The paper product is comprised of one or more plies of paper. Referring to FIG. 2, the paper 10 has embossments 20. Embossments 20 refer to regions in the paper 10 which have been subjected to densification or are otherwise compacted. The fibers comprising the paper 10 in the embossments 20 may be permanently and more tightly bonded together than the fibers in the regions of the paper 10 intermediate the embossments 20. The embossments 20 may be glassined. The embossments 20 are preferably distinct from one another, although if desired, the embossments 20 may form an essentially continuous network. The embossments 20 of the paper 10 are deflected out of the plane of the paper 10 by the protuberances of the embossing roll.

A single ply of paper 10 may be embossed on one side of the paper 10 or both sides of the paper 10. Likewise, if two or more plies are joined together in a face-to-face relationship to form a laminate, either ply can be embossed on one or both sides of each respective ply. Each ply is embossed by a plurality of embossments 20. The embossments 20 are deformed normal to the plane of the laminate and preferably towards the other ply.

Suitable means of embossing include those disclosed in U.S. Pat. No. : 3,323,983 issued to Palmer on Sep. 8, 1964; U.S. Pat. No. 5,468,323 issued to McNeil on Nov. 21, 1995; U.S. Pat. No. 5,693,406 issued to Wegele et al. on Dec. 2, 1997; U.S. Pat. No. 5,972,466 issued to Trokhan on Oct. 26, 1999; U.S. Pat. No. 6,030,690 issued to McNeil et al. on Feb. 29, 2000; and U.S. Pat. No. 6,086,715 issued to McNeil on Jul. 11, 2000 the disclosures of which are incorporated herein by reference.

Suitable means of laminating the plies include but are not limited to those methods disclosed in commonly assigned U.S. Pat. No. : 6,113,723 issued to McNeil et al. on Sep. 5, 2000; U.S. Pat. No. 6,086,715 issued to McNeil on Jul. 11, 2000; U.S. Pat. No. 5,972,466 issued to Trokhan on Oct. 26, 1999; U.S. Pat. No. 5,858,554 issued to Neal et al. on Jan. 12, 1999; U.S. Pat. No. 5,693,406 issued to Wegele et al. on Dec. 2, 1997; U.S. Pat. No. 5,468,323 issued to McNeil on Nov. 21, 1995; U.S. Pat. No. 5,294,475 issued to McNeil on Mar. 15, 1994; the disclosures of which are incorporated herein by reference.

The substrate which comprises the paper 10 of the present invention may be cellulosic, non-cellulosic, or a combination of both. The substrate may be conventionally dried, using one or more press felts. If the substrate which comprises the paper 10 according to the present invention is conventionally dried, it may be conventionally dried using a felt which applies a pattern to the paper 10 as taught by commonly assigned U.S. Pat. No. 5,556,509 issued Sep. 17, 1996 to Trokhan et al. and PCT Application WO 96/00812 published Jan. 11, 1996 in the name of Trokhan et al., the disclosures of which are incorporated herein by reference.

The substrate which comprises the paper 10 according to the present invention may also be through air dried. A suitable through air dried substrate may be made according to commonly assigned U.S. Pat. No. 4,191,609, the disclosure of which is incorporated herein by reference.

Preferably, the substrate which comprises the paper 10 according to the present invention is through air dried on a belt having a patterned framework. The belt according to the present invention may be made according to any of commonly assigned U.S. Pat. No. 4,637,859 issued Jan. 20, 1987 to Trokhan; U.S. Pat. No. 4,514,345 issued Apr. 30, 1985 to Johnson et al.; U.S. Pat. No. 5,328,565 issued Jul. 12, 1994 to Rasch et al.; and U.S. Pat. No. 5,334,289 issued Aug. 2, 1994 to Trokhan et al., the disclosures of which patents are incorporated herein by reference.

The patterned framework of the belt preferentially imprints a pattern comprising an essentially continuous network onto the paper 10 and further has deflection conduits dispersed within the pattern. The deflection conduits extend between opposed first and second surfaces of the framework. The deflection conduits allow domes 30 to form in the paper 10.

The through air dried paper 10 made according to the foregoing patents has a plurality of domes 30 formed during the papermaking process which are dispersed throughout an essentially continuous network region. The domes 30 extend generally perpendicular to the paper 10 and increase its caliper. The domes 30 generally correspond in geometry, and during papermaking in position, to the deflection conduits of the belt described above. There are an infinite variety of possible geometries, shapes, and arrangements for the deflection conduits and the domes 30 formed in the paper 10 therefrom. These shapes include those disclosed in commonly assigned U.S. Pat. No. 5,275,700 issued on Jan. 4, 1994 to Trokhan. Examples of these shapes include but are not limited to those described as the linear Idaho pattern, Bow-tie pattern, and Snowflake pattern.

The domes 30 protrude outwardly from the essentially continuous network of the paper 10 due to molding into the deflection conduits during the papermaking process. By molding into the deflection conduits during the papermaking process, the regions of the paper 10 comprising the domes 30 are deflected in the Z-direction. For the embodiments described herein, such a paper 10 may have between about 10 to 1000 domes per square inch (i.e.; about 1.55 to 155 domes per square centimeter).

If the paper 10 has domes 30, or other prominent features in the topography, each embossment 20 in the paper 10 has an area at least about 0.5 times as great as the area of the dome or other prominent feature in the topography.

The paper 10 according to the present invention having domes 30 may be made according to commonly assigned U.S. Pat. No. : 4,528,239 issued Jul. 9, 1985 to Trokhan; U.S. Pat. No. 4,529,480 issued Jul. 16, 1985 to Trokhan; U.S. Pat. No. 5,245,025 issued Sep. 14, 1993 to Trokhan et al.; U.S. Pat. No. 5,275,700 issued Jan. 4, 1994 to Trokhan; U.S. Pat. No. 5,364,504 issued Nov. 15, 1985 to Smurkoski et al.; U.S. Pat. No. 5,527,428 issued Jun. 18, 1996 to Trokhan et al.; U.S. Pat. No. 5,609,725 issued Mar. 11, 1997 to Van Phan; U.S. Pat. No. 5,679,222 issued Oct. 21, 1997 to Rasch et al.; U.S. Pat. No. 5,709,775 issued Jan. 20, 1995 to Trokhan et al; U.S. Pat. No. 5,776,312 issued Jul. 7, 1998 to Trokhan et al.; U.S. Pat. No. 5,795,440 issued Aug. 18, 1998 to Ampulski et al.; U.S. Pat. No. 5,900,122 issued May 4, 1999 to Huston; U.S. Pat. No. 5,906,710 issued May 25, 1999 to Trokhan; U.S. Pat. No. 5,935,381 issued Aug. 10, 1999 to Trokhan et al.; and U.S. Pat. No. 5,938,893 issued Aug. 17, 1999 to Trokhan et al., the disclosures of which are incorporated herein by reference.

Several variations in the substrate used for the paper 10 according to the present invention are feasible and may, depending upon the application, be desirable. The substrate which comprises the paper 10 according to the present invention may be creped or uncreped, as desired. The paper 10 according to the present invention may be layered. Layering is disclosed in commonly assigned U.S. Pat. No. : 3,994,771 issued Nov. 30, 1976 to Morgan et al.; U.S. Pat. No. 4,225,382 issued Sep. 30, 1980 to Kearney et al.; and U.S. Pat. No. 4,300,981 issued Nov. 17, 1981 to Carstens, the disclosures of which patents are incorporated herein by reference.

To further increase the soft tactile sensation of the paper 10, chemical softeners may be added to the paper 10. Suitable chemical softeners may be added according to the teachings of commonly assigned U.S. Pat. No. 5,217,576 issued Jun. 8, 1993 to Phan; U.S. Pat. No. 5,262,007 issued Nov. 16, 1993 to Phan et al., and U.S. Ser. No. 09/334,150 filed Jun. 16, 1999 now U.S. Pat. No. 6,241,850 in the name of Kelly, the disclosures of which are incorporated herein by reference.

Additionally, silicone may be applied to the paper 10 according to the present invention as taught by commonly assigned U.S. Pat. No. 5,215,626 issued Jun. 1, 1993 to Ampulski et al. and U.S. Pat. No. 5,389,204 issued Feb. 14, 1995 to Ampulski, the disclosures of which patents are incorporated herein by reference.

The paper 10 may be moistened, as disclosed in commonly assigned U.S. Pat. No. 5,332,118 issued Jul. 26, 1994 to Muckenfuhs, the disclosure of which patent is incorporated herein by reference.

The paper 10 of the present invention will have a total embossed area of about 15% or less, preferably about 10% or less, and most preferably about 8% or less. The present invention defines a relationship between the size dimension (i.e.; area) of the individual embossments 20 and the total number of embossments 20 (i.e.; embossment frequency) per unit area of paper. This relationship, known as the E factor, is defined as follows:

$$E = S/N \times 100$$

wherein E is the E factor

S is the area of the individual embossment

N is the number of embossments per unit area of paper

The paper 10 of the present invention will have between about 5 to 25 embossments per square inch of paper (i.e.; 0.775 to 3.875 embossments per square centimeter of paper). The paper 10 of the present invention will have an E factor of between about 0.0100 to 3 inches$^4$/number of embossments (i.e.; about 0.416 to 125 cm$^4$/number of embossments), preferably between about 0.0125 to 2 inches$^4$/number of embossments (i.e.; about 0.520 to 83.324 cm$^4$/number of embossments), and most preferably between about 0.0150 to 1 inches$^4$/number of embossments (i.e.; about 0.624 to 41.62 cm$^4$/number of embossments). Each embossment may be made on a roll having knobs which protude from about 0.05 inches (0.127 cm) to 0.1 inches (0.254 cm) from the plane of the roll.

The paper 10 of the present invention will have a ratio of the number of embossments per unit area to the number of domes per unit area of about 0.025 to 0.25 and preferably about 0.05 to 0.175.

Calculations and Test Procedures

A. Determining the Area of the Individual Embossment

Embossments 20 are often based on standard plane geometry shapes such as circles, ovals, various quadrilaterals and the like, both alone and in combination. For such plane geometry figures, the area of an individual embossment 20 can be readily derived from well known mathematical formulas. For more complex shapes, various area calculation methods may be used. One such technique follows. Start with an image of a single embossment 20 at a known magnification of the original (for example 100×) on an otherwise clean sheet of paper, cardboard or the like. Calculate the area of the paper and weigh it. Cut out the image of the embossment 20 and weigh it. With the known weight and size of the whole paper, and the known weight and magnification of the embossment image, the area of the actual embossment 20 may be calculated as follows:

$$\text{embossment area}=((\text{embossment image weight}/\text{paper weight})\times \text{paper area})/\text{magnification}^2$$

B. Determining the Number of Embossments (i.e.; Embossment Frequency) and Total Embossed Area Embossments 20 are usually arranged in a repeating pattern. The number of embossments 20 per square area can readily be determined as follows. Select an area of the pattern that is inclusive of at least 4 pattern repeats. Measure this area and count the number of embossments 20. The "embossment frequency" is calculated by dividing the number of embossments 20 by the area selected.

The percent total embossed area of the paper is determined by multiplying the area of the individual embossment by the number of embossments per unit area of paper and multiplying this product×100 (i.e.; (S×N)×100).

C. Horizontal Full Sheet (HFS)

The Horizontal Full Sheet (HFS) test method determines the amount of distilled water absorbed and retained by the paper of the present invention. This method is performed by first weighing a sample of the paper to be tested (referred to herein as the "Dry Weight of the paper"), then thoroughly wetting the paper, draining the wetted paper in a horizontal position and then reweighing (referred to herein as "Wet Weight of the paper"). The absorptive capacity of the paper is then computed as the amount of water retained in units of grams of water absorbed by the paper. When evaluating different paper samples, the same size of paper is used for all samples tested.

The apparatus for determining the HFS capacity of paper comprises the following: An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the paper tested (i.e.; a paper sample of about 11 in. (27.9 cm) by 11 in. (27.9 cm)). The balance pan can be made out of a variety of materials. Plexiglass is a common material used.

A sample support rack and sample support cover is also required. Both the rack and cover are comprised of a lightweight metal frame, strung with 0.012 in. (0.305 cm) diameter monofilament so as to form a grid of 0.5 inch squares (1.27 $cm^2$). The size of the support rack and cover is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

The paper to be tested is carefully weighed on the balance to the nearest 0.01 grams. The dry weight of the sample is reported to the nearest 0.01 grams. The empty sample support rack is placed on the balance with the special balance pan described above. The balance is then zeroed (tared). The sample is carefully placed on the sample support rack. The support rack cover is placed on top of the support rack. The sample (now sandwiched between the rack and cover) is submerged in the water reservoir. After the sample has been submerged for 60 seconds, the sample support rack and cover are gently raised out of the reservoir.

The sample, support rack and cover are allowed to drain horizontally for 120±5 seconds, taking care not to excessively shake or vibrate the sample. Next, the rack cover is carefully removed and the wet sample and the support rack are weighed on the previously tared balance. The weight is recorded to the nearest 0.01 g. This is the wet weight of the sample.

The gram per paper sample absorptive capacity of the sample is defined as (Wet Weight of the paper−Dry Weight of the paper).

D. Horizontal Rate Capacity (HRC)

Horizontal Rate Capacity (HRC) is an absorbency rate test that measures the quantity of water taken up by a paper sample in a two second time period. The value is reported in grams of water per second. The instrument used to carry out the HRC measurement comprises a pump, pressure gauge, inlet shunt, rotometer, reservoir, sump, outlet shunt, water supply tube, sample holder, sample, balance, and tubing. The instrument is illustrated in U.S. Pat. No. 5,908,707 issued to Cabell et al. the disclosure of which is incorporated herein by reference for the purposes of showing the instrument used to carry out the HRC measurement.

In this method, the sample (cut using a 3 in. (7.6 cm) diameter cutting die) is placed horizontally in a holder suspended from an electronic balance. The holder is made up of a lightweight frame measuring approximately 7 in. by 7 in. (17 cm by 17 cm), with lightweight nylon monofilament strung through the frame to form a grid of 0.5 in. (1.27 cm) squares. The nylon monofilament for stringing the support rack should be 0.069±0.005 in. (0.175 cm±0.0127 cm) in diameter (e.g., Berkley Trilene Line 2 lb test clear). The electronic balance used should be capable of measuring to the nearest 0.001 g. (e.g., Sartorious L420P+).

The sample in the holder is centered above a water supply tube. The water supply is a plastic tube having a 0.312 inch (0.79 cm) inside diameter containing distilled water at 23°±1° C. The supply tube is connected to a fluid reservoir at zero hydrostatic head relative to the test sample. The water supply tube is connected to the reservoir using plastic (e.g. Tygon®) tubing. The height of the nylon monofilament of the sample holder is located 0.125 in.±1/64 in. (0.32 cm±0.04 cm) above the top of the water supply tube.

The water height in the reservoir should be level with the top of the water supply tube. The water in the reservoir is continuously circulated using a water pump circulation rate of 85–93 ml/second using a water pump (e.g., Cole-Palmer Masterflex 7518-02) with #6409-15 plastic tubing. The circulation rate is measured by a rotometer tube (e.g., Cole-Palmer N092-04 having stainless steel valves and float). This circulation rate through the rotometer creates a head pressure of 2.5±0.5 psi as measured by an Ashcroft glycerine filled gauge.

Before conducting this measurement, the samples should be conditioned to 23°±1° C. and 50±2% Relative Humidity for 2 hours. The HRC test is also performed in these controlled environmental conditions.

To start the absorbent rate measurement, the 3 in. (7.62 cm) sample is placed on the sample holder. Its weight is recorded in 1 second intervals for a total of 5 seconds. The weight is averaged (herein referred to as "Average Sample Dry Weight"). Next, the circulating water is shunted to the sample water supply for 0.5 seconds by shunting through the valve. The weight reading on the electronic balance is monitored. When the weight begins to increase from zero a stop watch is started. At 2.0 seconds the sample water supply is shunted to the inlet of the circulating pump to break contact between the sample and the water in the supply tube.

The shunt is performed by diverting through the valve. The minimum shunt time is at least 5 seconds. The weight of the sample and absorbed water is recorded to the nearest 0.001 g. at time equals 11.0, 12.0, 13.0, 14.0 and 15.0 seconds. The five measurements are averaged and recorded as "Average Sample Wet Weight".

The increase in weight of the sample as a result of water being absorbed from the tube to the sample is used to determine the absorbency rate. In this case, the rate (grams of water per second) is calculated as:

(Average Sample Wet Weight−Average Sample Dry Weight)/2 seconds

It is understood by one skilled in the art that the timing, pulsing sequences, and electronic weight measurement can be computer automated.

E. Measurement of Panel Softness

Ideally, prior to softness testing, the paper samples to be tested should be conditioned according to Tappi Method #T402OM-88. Here, samples are preconditioned for 24 hours at a relative humidity level of 10% to 35% and within a temperature range of 22° C. to 40° C. After this preconditioning step, samples should be conditioned for 24 hours at a relative humidity of 48% to 52% and within a temperature range of 22° C. to 24° C.

Ideally, the softness panel testing should take place within the confines of a constant temperature and humidity room. If this is not feasible, all samples, including the controls, should experience identical environmental exposure conditions.

Softness testing is performed as a paired comparison in a form similar to that described in "Manual on Sensory Testing Methods", ASTM Special Technical Publication 434, published by the American Society For Testing and Materials 1968 and is incorporated herein by reference. Softness is evaluated by subjective testing using what is referred to as a Paired Difference Test. The method employs a standard external to the test material itself. For tactile perceived softness, two samples are presented such that the subject cannot see the samples, and the subject is required to choose one of them on the basis of tactile softness. The result of the test is reported in what is referred to as Panel Score Unit (PSU).

With respect to softness testing to obtain the softness data reported herein in PSU, a number of softness panel tests are performed. In each test ten practiced softness judges are asked to rate the relative softness of three sets of paired samples. The pairs of samples are judged one pair at a time by each judge: one sample of each pair being designated X and the other Y. Briefly, each X sample is graded against its paired Y sample as follows:

1. a grade of plus one is given if X is judged to may be a little softer than Y, and a grade of minus one is given if Y is judged to may be a little softer than X;
2. a grade of plus two is given if X is judged to surely be a little softer than Y, and a grade of minus two is given if Y is judged to surely be a little softer than X;
3. a grade of plus three is given to X if it is judged to be a lot softer than Y, and a grade of minus three is given if Y is judged to be a lot softer than X; and, lastly:
4. a grade of plus four is given to X if it is judged to be a whole lot softer than Y, and a grade of minus 4 is given if Y is judged to be a whole lot softer than X.

The grades are averaged and the resultant value is in units of PSU. The resulting data are considered the results of one panel test. If more than one sample pair is evaluated then all sample pairs are rank ordered according to their grades by paired statistical analysis. Then, the rank is shifted up or down in value as required to give a zero PSU value to which ever sample is chosen to be the zero-base standard. The other samples then have plus or minus values as determined by their relative grades with respect to the zero-base standard. The number of panel tests performed and averaged is such that about 0.2 PSU represents a significant difference in subjectively perceived softness.

F. Measurement of Bending Stiffness

The following procedure can be used to determine the bending stiffness of paper. Bending stiffness is an indication of the drape or flexibility of the paper. The Kawabata Evaluation System-2, Pure Bending Tester (i.e.; KES-FB2, manufactured by a Division of Instrumentation, Kato Tekko Company, Ltd. of Kyoto, Japan) may be used for this purpose.

Samples of the paper to be tested are cut to approximately 7.5×7.5 inches (19×19 cm) in the machine and cross machine direction. The paper sample width is measured to 0.01 inches (0.025 cm). The sample width is converted to centimeters. The outer ply (i.e.; the ply that is facing outwardly on a roll of the paper sample) and inner ply as presented on the roll are identified and marked.

The sample is placed in the jaws of the KES-FB2 such that the sample is first bent with the outer ply undergoing tension and the inner ply undergoing compression. In the orientation of the KES-FB2 the outer ply is right facing and the inner ply is left facing. The distance between the front moving jaw and the rear stationary jaw is 1 cm. The sample is secured in the instrument in the following manner. First the front moving chuck and the rear stationary chuck are opened to accept the sample. The sample is inserted midway between the top and bottom of the jaws such that the machine direction of the sample is parallel to the jaws (i.e.; vertical in the KES-FB2 holder).

The rear stationary chuck is then closed by uniformly tightening the upper and lower thumb screws until the sample is snug, but not overly tight. The jaws on the front stationary chuck are then closed in a similar fashion. The sample is adjusted for squareness in the chuck, then the front jaws are tightened to insure the sample is held securely. The distance (d) between the front chuck and the rear chuck is 1 cm.

The output of the instrument is load cell voltage (Vy) and curvature voltage (Vx). The load cell voltage is converted to a bending moment normalized for sample width (M) in the following manner:

$$\text{Moment } (M, \text{gf*cm/cm}) = (Vy*Sy*d)/W$$

where

Vy is the load cell voltage,

Sy is the instrument sensitivity in gf*cm/V, d is the distance between the chucks, and W is the sample width in centimeters.

The sensitivity switch of the instrument is set at 5×1. Using this setting the instrument is calibrated using two 50 gram weights. Each weight is suspended from a thread. The thread is wrapped around the bar on the bottom end of the rear stationary chuck and hooked to a pin extending from the front and back of the center of the shaft. One weight thread is wrapped around the front and hooked to the back pin. The other weight thread is wrapped around the back of the shaft and hooked to the front pin. Two pulleys are secured to the instrument on the right and left side.

The top of the pulleys are horizontal to the center pin. Both weights are then hung over the pulleys (one on the left and one on the right) at the same time. The full scale voltage is set at 10 V. The radius of the center shaft is 0.5 cm. Thus the resultant full scale sensitivity (Sy) for the Moment axis is 100 gf*0.5 cm/10V (5 gf*cm/V).

The output for the Curvature axis is calibrated by starting the measurement motor and manually stopping the moving chuck when the indicator dial reaches 1.0 $cm^{-1}$. The output voltage (Vx) is adjusted to 0.5 volts. The resultant sensitivity (Sx) for the curvature axis is 2/(volts*cm). The curvature (K) is obtained in the following manner:

$$\text{Curvature } (K, \text{cm}^{-1}) = Sx*Vx$$

where

Sx is the sensitivity of the curvature axis and Vx is the output voltage

For determination of the bending stiffness the moving chuck is cycled from a curvature of 0 $cm^{-1}$ to +1 $cm^{-1}$ to −1 $cm^{-1}$ to 0 $cm^{-1}$ at a rate of 0.5 $cm^{-1}$/sec. Each sample is cycled continuously until four complete cycles are obtained. The output voltage of the instrument is recorded in a digital format using a personal computer. At the start of the test there is no tension on the sample. As the test begins the load cell begins to experience a load as the sample is bent. The initial rotation is clockwise when viewed from the top down on the instrument.

The load continues to increase until the bending curvature reaches approximately +1 $cm^{-1}$ (this is the Forward Bend (FB)). At approximately +1 $cm^{-1}$ the direction of rotation was reversed. During the return the load cell reading decreases. This is the Forward Bend Return (FR). As the rotating chuck passes 0, curvature begins in the opposite direction. The Backward Bend (BB) and Backward Bend Return (BR) was obtained.

The data was analyzed in the following manner. A linear regression line was obtained between approximately 0.2 and 0.7 $cm^{-1}$ for the Forward Bend (FB) and Forward Bend Return (FR). A linear regression line was obtained between approximately −0.2 and −0.7 $cm^{-1}$ for the Backward Bend (BB) and the Backward Bend Return (BR). This was obtained for each of the four cycles for each of the four segments (i.e.; FB, FR, BB, BR). The slope of each line was reported as the Bending Stiffness (B). It has units of gf*$cm^2$/cm. The Bending Stiffness of the Forward Bend was noted as BFB. The individual segment values for the four cycles were averaged and reported as an average BFB, BFR, BBF, and BBR. Three separate samples were run. The reported values are the grand averages of the BFB, BFR, BBF, and BBR of the three samples.

EXAMPLE

For comparison purposes a prior art paper sample not according to the present invention was made as follows:

Prior Art Example

The prior art paper product was made from two plies of cellulosic fibers as is commonly used in BOUNTY® brand paper towels marketed by the instant assignee. Each ply was made of 65 percent northern softwood kraft, 35 percent CTMP, and had a basis weight of approximately 14 pounds per 3,000 square feet (22.7 gsm). Each ply was embossed in a nested embossing process by elliptically shaped embossments having at the distal end a major axis of about 0.084 inches (0.213 cm) and a minor axis of about 0.042 inches (0.0107 cm). The embossments were made on a roll having knobs which protuded about 0.070 inches (0.178 cm) from the plane of the roll.

The embossments were spaced in a complementary concentric diamond pattern on a 45 degree pitch of about 0.118 inches (0.30 cm). Two complementary plies were made and joined together at a zero clearance marrying nip, so that a unitary laminate having about 36 embossments per square inch (5.6 embossments per $cm^2$) per ply was formed.

Present Invention Example

A nonlimiting example of one paper 10 product made according to the present invention is described below and illustrated in FIGS. 1A and 1B. The paper 10 product was made from two plies of cellulosic fibers as is commonly used in BOUNTY® brand paper 10 towels marketed by the instant assignee. Each ply was made of 65 percent northern softwood kraft, 35 percent CTMP, and had a basis weight of approximately 14 pounds per 3,000 square feet (2.7 gsm). Each ply was embossed in a nested embossing process by elliptically shaped embossments having at the distal end a major axis of about 0.120 inches, (0.305 cm) and a minor axis of about 0.060 inches (0.152 cm). The embossments were made on a roll having knobs which protuded about 0.070 inches (0.178 cm) from the plane of the roll. The embossments were spaced in a complementary concentric diamond pattern on a 45 degree pitch of about 0.148 inches (0.376 cm).

Figure 1A:
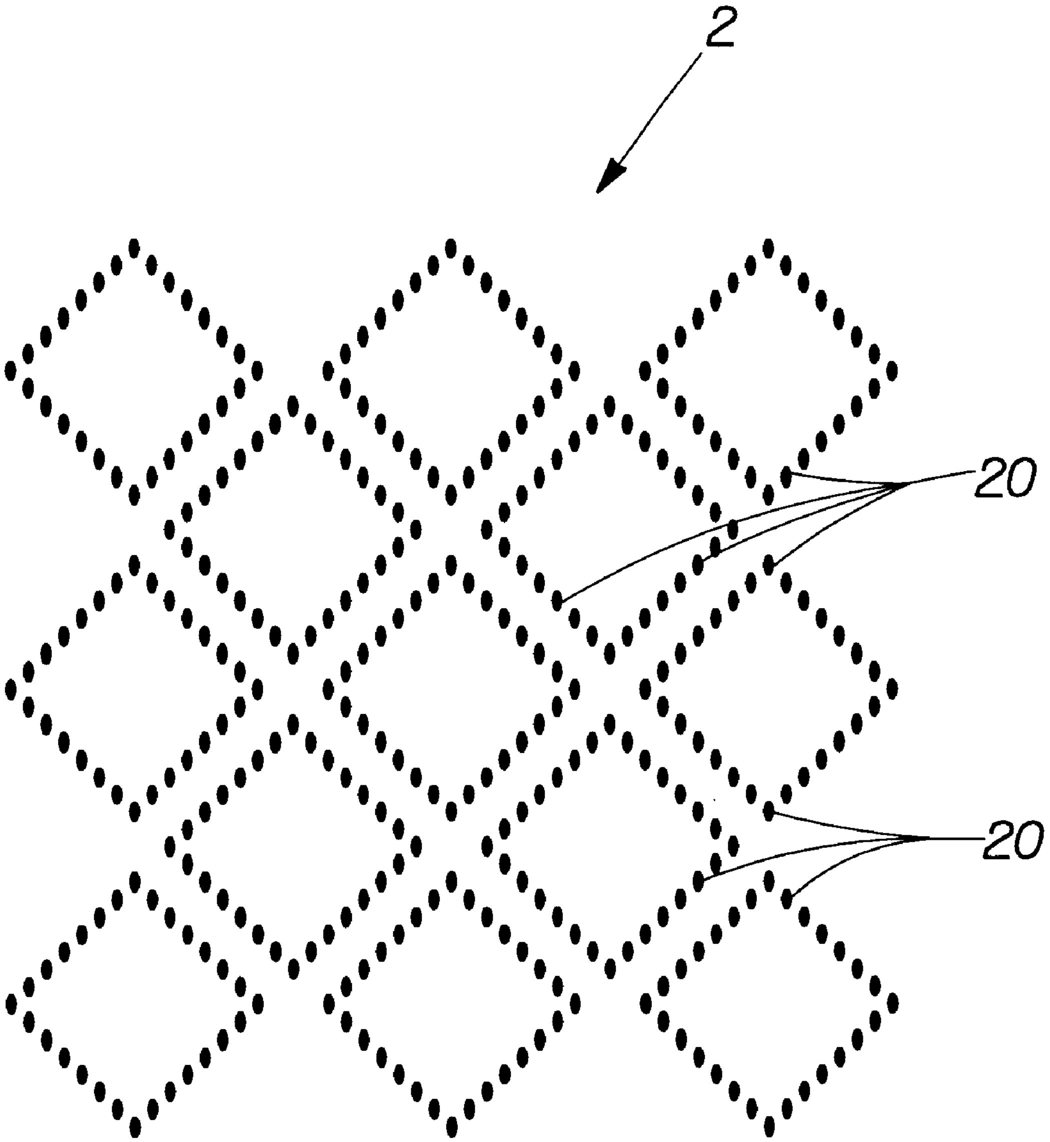
FIG. 1A is a fragmentary plan view of a multiple ply paper product displaying an embodiment of an embossment pattern on the first ply made according to the present invention.
Figure 1B:
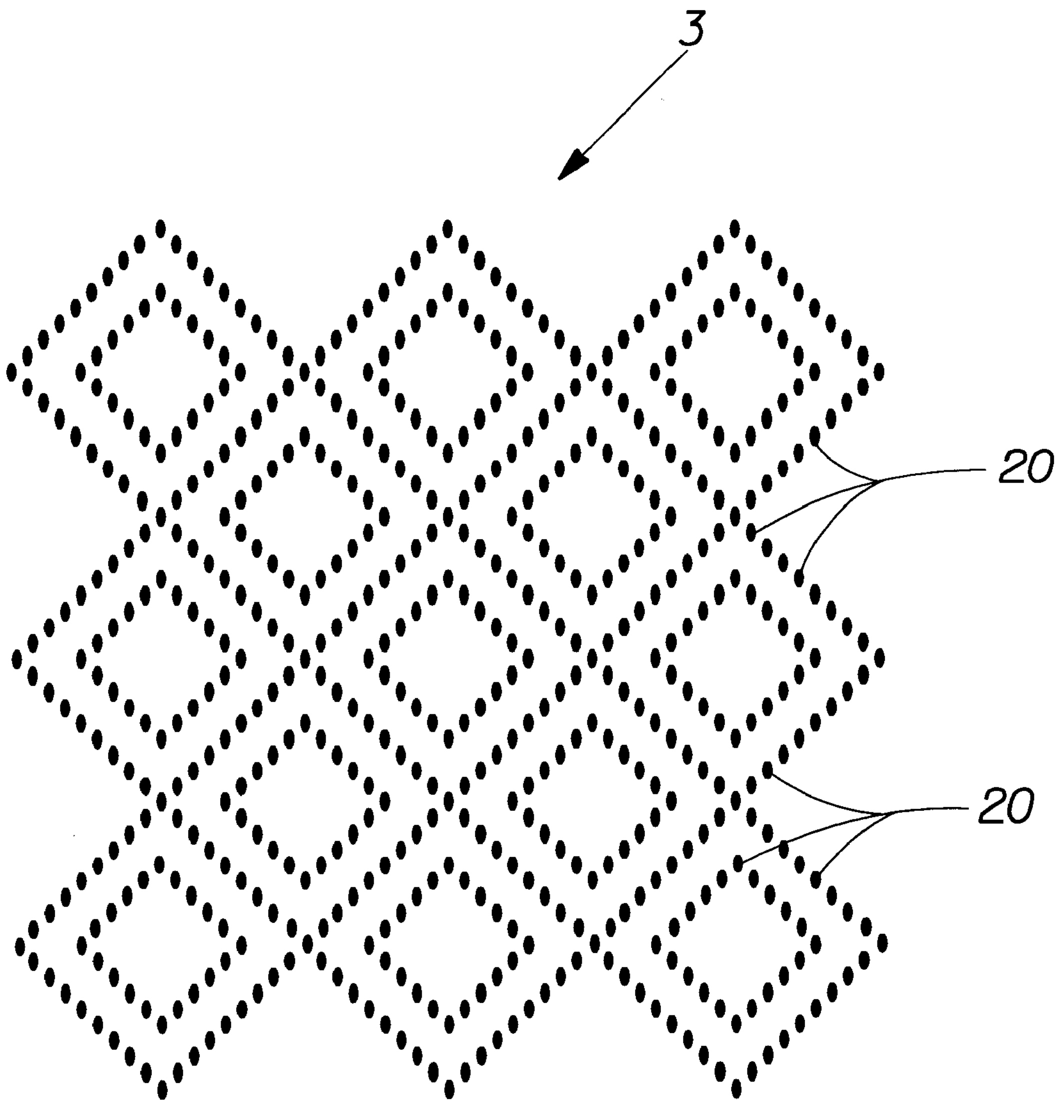
FIG. 1B is a fragmentary plan view of a multiple ply paper product displaying an embodiment of an embossment pattern on the second ply made according to the present invention.

FIGS. 1A and 1B illustrate an embodiment of the present invention as described above. Referring to FIG. 1A, the embossments 20 on the first ply 2 (outward facing ply) comprise about 8 percent of the area of the first ply 2 and have about 15 embossments per square inch (i.e.; 2.3 embossments per $cm^2$). Referring to FIG. 1B, the embossments 20 on the second ply 3 (inward facing ply) comprise about 11 percent of the area of second ply 3 and have about 20 embossments per square inch (i.e.; 3.1 embossments per $cm^2$).

The two complementary plies were made. Adhesive was applied to the embossments 20 of the outward facing ply, and the plies were joined together at a zero clearance marrying nip, so that a unitary laminate was formed.

Referring to Table I, column 1, paper samples representing the prior art and present invention are described. The samples representing the prior art were made in accordance with the prior art example above. The samples representing the present invention were made in accordance with the present invention example above.

Column 2 indicates the basis weight of each sample. Column 3 indicates the shape of the dome which is formed during the papermaking process. Column 4 indicates the number of domes per square inch of paper. Column 5 indicates the area of each individual dome.

Column 6 and 7 indicate the dimension of the distal end of the major axis and the dimension of the minor axis respectively. Column 8 indicates the depth of each knob on the embossment roll used to make the respective sample. Column 9 indicates the area of each embossment. Column 10 indicates the number of embossments found per square inch of paper. Column 11 indicates the E factor for each sample. Column 12 indicates the percent total embossed area of the paper.

Column 13 indicates the aesthetic appearance rating of each paper sample. The aesthetic appearance rate was determined as follows: 100 panelists were asked to evaluate the eight different samples of paper towel rolls as described in Table I. The order in which the panelists saw the samples was random. The samples were displayed under fluorescent lighting. Each of the panelists was asked the following question: "Each paper towel has a diamond shaped quilted pattern on the roll. Please rate each roll for how easy it is to see the diamond quilting pattern." The panelists were asked to rate the samples on a scale of −4 (extremely difficult, diamond pattern is not at all visible) to 4 (extremely easy, pattern is extremely visible) with a rating of "0" meaning it was neither difficult nor easy to see the diamond pattern. Column 13 of Table I provides the average rating for each sample viewed by the panelists.

invention) from Table I. The bending stiffness data was generated in accordance with the bending stiffness procedures previously described.

Referring to Table IV, this table illustrates the panel softness data for Sample B (prior art) and Sample E (present invention) from Table I. The panel softness data was generated in accordance with the panel softness procedures previously described.

TABLE I

| (1) Sample | (2) Approximate Basis Weight of Single Ply (lbs/3000 ft$^2$) | (3) Dome Shape | (4) Domes/inch$^2$ | (5) Area of Dome (inches$^2$) | (6) Embossment Distal End Major Axis Dimension (inches) | (7) Embossment Minor Axis Dimension (inches) | (8) Embossment Roll Knob Depth (inches) |
|---|---|---|---|---|---|---|---|
| A (Prior Art) | 13 (2.5 gsm) | Linear Idaho | 240 (37.2 domes/cm$^2$) | .00313 (0.0202 cm$^2$) | 0.084 (0.213 cm) | 0.042 (0.107 cm) | 0.070 (0.178 cm) |
| I (Prior Art) | 13 (2.5 gsm) | Linear Idaho | 240 (37.2 domes/cm$^2$) | .00313 (0.0202 cm$^2$) | 0.055 (0.139 cm) | 0.027 (0.069 cm) | 0.070 (0.178 cm) |
| H (Present Invention) | 13 (2.5 gsm) | Linear Idaho | 240 (37.2 domes/cm$^2$) | .00313 (0.0202 cm$^2$) | 0.120 (0.305 cm) | 0.060 (0.152 cm) | 0.070 (0.178 cm) |
| J (Present Invention) | 13 (2.5 gsm) | Linear Idaho | 240 (37.2 domes/cm$^2$) | .00313 (0.0202 cm$^2$) | 0.084 (0.213 cm) | 0.042 (0.107 cm) | 0.070 (0.178 cm) |
| B (Prior Art) | 15 (2.9 gsm) | Snowflake | 95 (14.7 domes/cm$^2$) | .00789 (0.0509 cm$^2$) | 0.084 (0.213 cm) | 0.042 (0.107 cm) | 0.070 (0.178 cm) |
| E (Present Invention) | 15 (2.9 gsm) | Snowflake | 95 (14.7 domes/cm$^2$) | .00789 (0.0509 cm$^2$) | 0.120 (0.305 cm) | 0.060 (0.152 cm) | 0.070 (0.178 cm) |
| K (Present Inventions) | 15 (2.9 gsm) | Snowflake | 95 (14.7 domes/cm$^2$) | .00789 (0.0509 cm$^2$) | 0.084 (0.213 cm) | 0.042 (0.107 cm) | 0.070 (0.178 cm) |
| G (Prior Art) | 12 (2.3 gsm) | Linear Idaho | 562 (14.7 domes/cm$^2$) | .00134 (0.0509 cm$^2$) | 0.055 (0.139 cm) | 0.027 (0.069 cm) | 0.070 (0.178 cm) |

| (1) Sample | (9) Embossment Area (inches$^2$) | (10) No. of Embossments per sq. inch of Paper | (11) E Factor (inches$^4$ per number of embossments) | (12) % Total Embossed Area | (13) Average Aesthetic Appearance Rating |
|---|---|---|---|---|---|
| A (Prior Art) | 0.00277 (0.01788 cm$^2$) | 36 (5.6 emboss./cm$^2$) | 0.0077 (0.320 cm$^4$/# emboss.) | 10 | 2.0 |
| I (Prior Art) | 0.00117 (0.00755 cm$^2$) | 36 (5.6 emboss/cm$^2$) | 0.0033 (0.135 cm$^4$# emboss.) | 4 | 1.3 |
| H (Present Invention) | 0.00565 (0.03658 cm$^2$) | 15 (2.3 emboss./cm$^2$) | 0.0377 (1.569 cm$^4$/# emboss.) | 8 | 2.8 |
| J (Present Invention) | 0.00277 (0.01788 cm$^2$) | 15 (2.3 emboss/cm$^2$) | 0.0185 (0.769 cm$^4$/# emboss.) | 4 | 2.9 |
| B (Prior Art) | 0.00277 (0.01758 cm$^2$) | 36 (5.6 emboss./cm$^2$) | 0.0077 (0.320 cm$^4$/# emboss.) | 10 | −0.2 |
| E (Present Invention) | 0.00565 (0.03648 cm$^2$) | 15 (2.3 emboss/cm$^2$) | 0.0377 (1.569 cm$^4$/# emboss.) | 8 | 1.9 |
| K (Present Inventions) | 0.00277 (0.01788 cm$^2$) | 15 (2.3 emboss./cm$^2$) | 0.0185 (0.769 cm$^4$/# emboss.) | 4 | 2.0 |
| G (Prior Art) | 0.00117 (0.00755 cm$^2$) | 36 (5.6 emboss./cm$^2$) | 0.0033 (0.135 cm/# emboss.) | 4 | 1.6 |

Figure 3:
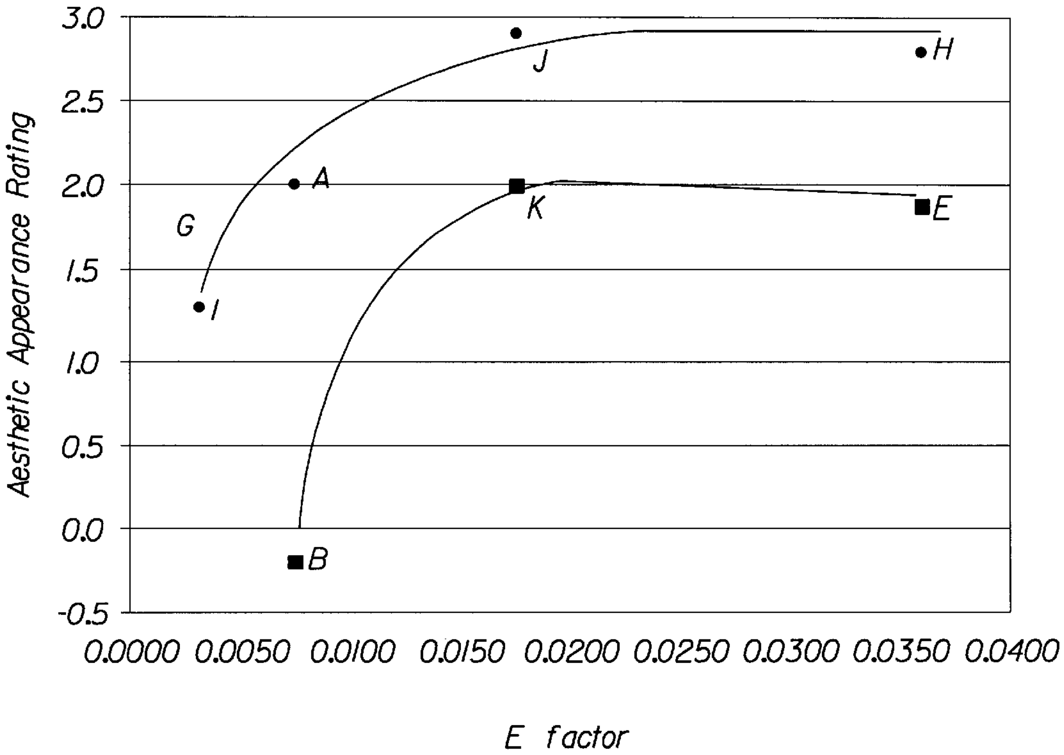
FIG. 3 is a graph of the aesthetic appearance rating (y-axis) versus E factor (x-axis) for the data presented in Table I.

Referring to FIG. 3, this graph represents a plot of E factor (horizontal X-axis)for each sample from Table 1, column 11 versus the average aesthetic appearance rating (vertical Y-axis) from Table I, column 13.

Referring to Table II, this table illustrates the absorbency data for Sample B (prior art) and Sample E (present invention) from Table I. The absorbency data was generated in accordance with the HFS and the HRC procedures previously described. For HFS measurement, a paper sample size of 11 inches by 11 inches (27.9 cm by 27.9 cm) was used.

Referring to Table III, this table illustrates the bending stiffness data for Sample B (prior art) and Sample E (present

TABLE II

Absorbency Data

| (1) Test | (2) Sample B (Prior Art) (n = 24) | (3) Sample E (Present Invention) (n = 40) | (4) % Difference |
|---|---|---|---|
| HFS (grams/paper sample) | 78 | 86 | 11% |
| HRC (grams/second) | 0.39 | 0.42 | 8% |

TABLE III

| Bending Stiffness(1) Test | (2) Sample B (Prior Art) (n = 24) | (3) Sample E (Present Invention) (n = 24) | (4) % Difference |
|---|---|---|---|
| Bending Stiffness ($gf*cm^2/cm$) | 0.19 | 0.16 | 17% |

TABLE IV

| | Softness | |
|---|---|---|
| (1) Test | (2) Sample B (Prior Art) (n = 16) | (3) Sample E (Present Invention) (n = 16) |
| Softness (PSU) | 0.0 | +0.7 |

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of the invention.

What is claimed is:

1. An embossed tissue paper said embossed tissue comprised of: one or more plies of tissue paper wherein at least one of said plies has a plurality of embossments thereon said tissue paper having a total embossed area of about 15% or less and an E factor of between about 0.0150 to 1 $inches^4$ per number of embossments.

2. The embossed tissue paper of claim 1 wherein said tissue paper is further comprised of a plurality of domes formed during the papermaking process wherein said domes comprise from about 10 to 1000 domes per square inch of said tissue paper.

3. The embossed tissue paper of claim 1 wherein said ply is embossed on one side of said tissue paper.

4. The embossed tissue paper of claim 1 wherein said ply is embossed on both sides of said tissue paper.

5. The embossed tissue paper of claim 1 wherein each of said embossments is made on a roll having knobs which protrude from about 0.05 inches to 0.1 inches from the plane of said roll.

6. The embossed tissue of claim 1 wherein the number of embossments per square inch of said tissue paper is between about 5 and 25.

7. The embossed tissue of claim 2 wherein the ratio per unit area of the number of said embossments to the number of said domes is about 0.025 to 0.25.

8. A multi-ply paper product, said multi-ply paper product comprising at least a first ply, and an adjacent second ply, each of said plies having first and second sides, one of said sides of said first ply joined to one of said sides of said second ply, at least one of said plies having embossments thereon wherein said embossments comprise about 15% or less of said multi-ply paper product and said multi-ply paper product has an E factor of between about 0.0150 to 1 $inches^4$ per number of embossments.

9. The multi-ply paper product of claim 8 wherein at least one of said first ply or said second ply comprises a plurality of domes formed during the papermaking process wherein said domes comprise from about 10 to 1000 domes per square inch of at least one of said first ply or said second ply.

10. The multi-ply paper product of claim 8 wherein said embossments extend outwardly from the plane of said ply towards and contacting said adjacent ply, said plies being joined to one another at said embossments.

11. The multi-ply paper product of claim 9 wherein said domes extend outwardly from the plane of said ply towards said adjacent ply.

12. The multi-ply paper product of claim 8 wherein each of said embossments is made on a roll having knobs which protrude from about 0.05 inches to 0.1 inches from the plane of said roll.

13. The multi-ply paper product of claim 8 wherein the number of embossments per square inch of said tissue paper is between about 5 and 25.

14. The multi-ply paper product of claim 9 wherein the ratio per unit area of the number of said embossments to the number of said domes is about 0.025 to 0.25.

15. An embossed tissue paper said embossed tissue comprised of:

one or more plies of tissue paper wherein at least one of said plies is comprised of a plurality of domes formed during the papermaking process wherein said domes comprise from about 10 to 1000 domes per square inch of said tissue paper and wherein said at least one of said plies has a plurality of embossments thereon said tissue paper having a total embossed area of about 15% or less and an E factor of between about 0.0100 to 3 $inches^4$ per number of embossments.

16. An embossed tissue paper said embossed tissue comprised of:

one or more plies of tissue paper wherein at least one of said plies has a plurality of embossments thereon said tissue paper having a total embossed area of about 8% or less and an E factor of between about 0.0100 to 3 $inches^4$ per number of embossments.

* * * * *